United States Patent

Charbonneaux

[15] 3,641,967

[45] Feb. 15, 1972

[54] HIGH-VISIBILITY METER

[72] Inventor: Wilson A. Charbonneaux, Dayton, Ohio

[73] Assignee: Simmonds Precision Products, Inc., Tarrytown, N.Y.

[22] Filed: Oct. 16, 1967

[21] Appl. No.: 675,535

[52] U.S. Cl. ..................116/129 L, 73/431, 116/129 E, 240/1 EL
[51] Int. Cl. ..................................B60q 3/04, G01d 11/28
[58] Field of Search............116/129 E, 129 F, 129 H, 129 P, 116/124.4, 135; 240/2.1, 1 EL, 1; 73/431

[56] References Cited

UNITED STATES PATENTS

| | | | |
|---|---|---|---|
| 1,297,459 | 3/1919 | Gelatt | 116/129 F |
| 1,942,343 | 1/1934 | Melik-Minassiantz | 116/129 E |
| 2,158,925 | 5/1939 | Braswell | 116/129 E |
| 2,173,316 | 9/1939 | Sproule | 240/2.1 |
| 2,317,109 | 4/1943 | Oxland | 116/129 E X |
| 2,902,970 | 9/1959 | Kadlec | 240/1 EI X |
| 3,129,691 | 4/1964 | Walker | 240/1 EI X |
| 3,131,670 | 5/1964 | Hardesty | 240/1 EI X |
| 3,139,854 | 7/1964 | Hedges et al. | 116/135 |
| 3,241,256 | 3/1966 | Viret et al. | 240/1 EI X |
| 3,320,922 | 5/1967 | Taylor et al. | 116/118 |
| 3,246,134 | 4/1966 | White | 240/2.1 |

OTHER PUBLICATIONS

"Illuminating Device for Visual Indicators" F. E. Washurn-IBM Technical Disclusure Bulletin. Vol. 3 No. 7. Dec. 1960

*Primary Examiner*—Louis R. Prince
*Assistant Examiner*—Daniel M. Yasich
*Attorney*—Jerome P. Bloom

[57] ABSTRACT

An illuminated meter housed in a cylindrical sealed casing and offering maximum visibility and minimum potential of parallactic error in readings, achieved by structure providing that its indicator or pointer is embodied in a disc form and arranged closely adjacent and substantially coplanar with the related indicia. The indicia is incorporated in a dial body capable of transmitting or reflecting light with substantially uniform intensity.

11 Claims, 8 Drawing Figures

PATENTED FEB 15 1972 3,641,967
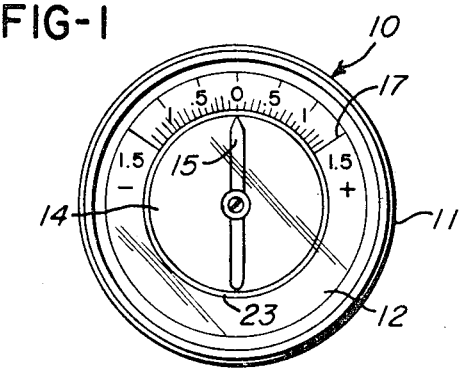
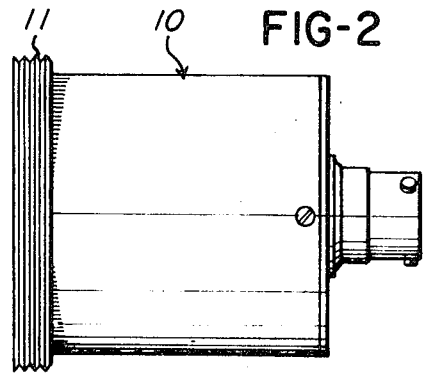
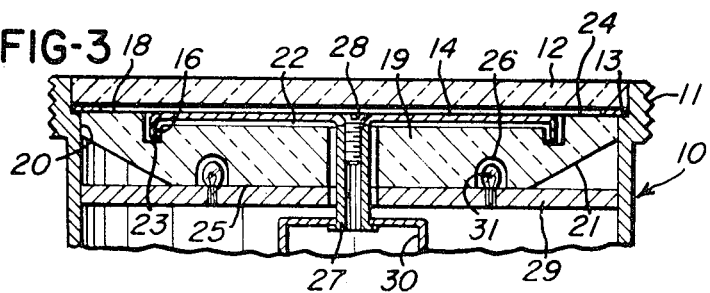
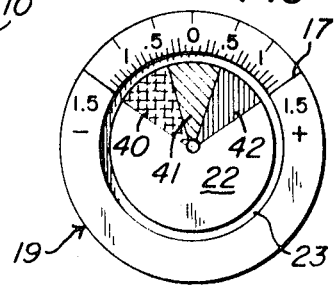
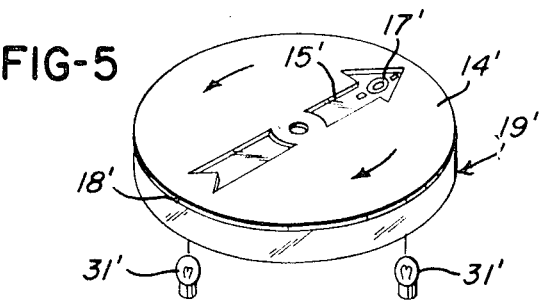
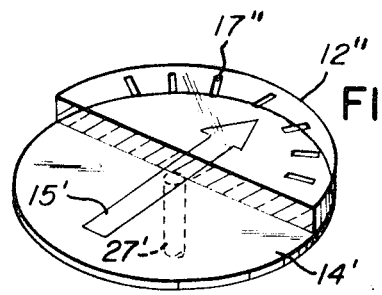
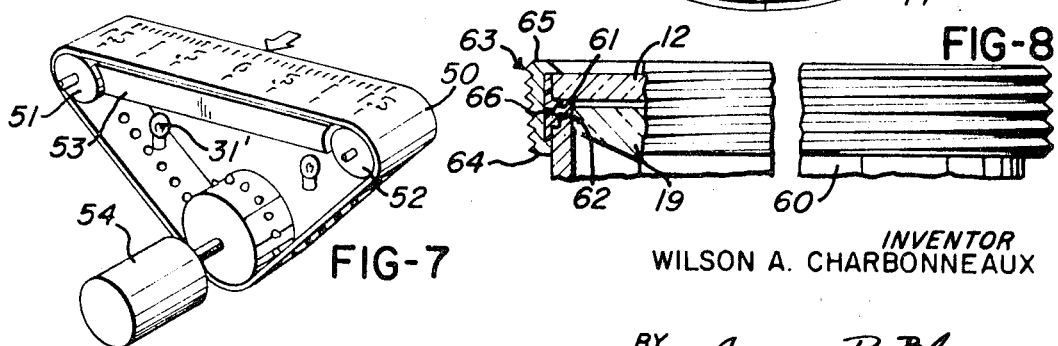
INVENTOR
WILSON A. CHARBONNEAUX
BY Jerome P. Bloom
ATTORNEY

HIGH-VISIBILITY METER

This invention relates to improvements in meters such as indicators, timepieces, electrical instruments, and signalling devices. It has significant advantage in application to such meters as are widely dispersed in an instrument panel, particularly that of an aircraft, and will be so described. It will be obvious, however, that its application is not so limited and such is not intended.

There are numerous meters embodied in the instrument panel of an aircraft, which meters transmit current and important information to the pilot and engineer. Problems arise from the fact that the observer has in each instance a relatively fixed post. Therefore, he must read the various meters from a distance and at a great variety of angles. This presents many problems.

For example, the conventional meter employed for the purposes described comprises a case open to either end. A glass window is normally installed in one end of the case through which the meter dial and indicator are viewed. Conventionally, for clearance purposes, the meter pointer is not only significantly spaced beneath the glass window but it is also spaced, in turn, from an underlying dial face. Since the pointer must have an adequate thickness to ensure its stable mount and operation, this together with the spacing requirements creates a stack up of vertical dimensions. Resultingly, in conventional meters of the type described the dial face may be about one-half inch below the window. Under such circumstances, when the observer has a fixed position and must quickly scan meters in which the reading components are so spaced and the angle of observation is so different in each case, his observations are inherently subject to inaccuracies due to parallactic error. In an aircraft this problem is multiplied since direct lighting of the meters is both impractical and undesirable.

There is yet another problem evident in meters of the prior art. Where lighting is used, the meters normally have a single light source which has a limited capacity. Moreover such light as is available is poorly applied. It usually happens that its intensity will vary over the face of the dial. This in itself makes a dial difficult to read with any accuracy.

The present invention obviates the above problems and provides additional improvements. It affords means to minimize and substantially eliminate the incidence of parallactic error in readings. It further provides a novel illuminable body capable of transmitting a uniform table of light to lend accurate readability to meters. It does, moreover, enable simple and inexpensive means to produce highly efficient meter units. Preferred embodiments also feature an improved meter case wherein the meter viewing window is uniquely secured and positively sealed.

A primary object of the invention is to provide an improved meter which can be economically fabricated, more efficient and satisfactory in use and adaptable to a wide variety of applications.

Another object of the present invention is to obviate or substantially minimize disadvantages of prior art meters to the end that a panel-type meter may be characterized by easy, accurate, wide-angled readability.

A further object of the invention is to provide a meter dial in the form of a novel illuminable body capable of transmitting a uniform table of light to achieve a high degree of readability in otherwise conventional meters.

An additional object of the invention is to provide a meter so constructed to substantially eliminate the incidence of parallactic error in readings.

Another object of the invention is to provide a preferred form of meter in which a large part of the conventional accumulated vertical dimension between the outer surface of the meter window and its dial face is eliminated, the dial indicia and the related pointer or indicator being arranged to lie in a substantially common plane, with a minimum clearance below the inside surface of the window.

A further object of the invention is to provide within a meter case a uniquely formed light-transmitting block constituting in part a dial and enabling a critically controlled illumination of the dial and its related pointer.

A further object of the invention is to provide a novel means and method for coating and applying indicia to a dial body.

Another object of the invention is to provide a unique means for a mechanical interlock of a meter glass to a meter case so as to effect a simple but permanent seal of the case while obtaining an optimal exposure.

Still another object of the invention is to provide a unique means for effecting a meter employing a color-coded indicating means.

An additional object of the invention is to provide a meter including a generally more stable and readily readable pointer or indicator which is embodied therein as a rotatable disc.

A still further object of the invention is to provide high visibility in a rectangular or edgewise meter using a tape or like device.

Another object of the invention is to provide a meter possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein some but not necessarily all the various embodiments of the invention are shown, FIG. 1 illustrates a plan or face view of a meter embodying the present invention;

FIG. 2 is a side view thereof;

FIG. 3 is an enlarged fragmentary view, with the meter shown in cross section;

FIG. 4 is a view like that of FIG. 1 with the meter case and indicator disc removed for clarity of disclosure;

FIGS. 5, 6 and 7 are schematic illustrations of various other embodiments of the present invention; and FIG. 8 illustrates an improvement in the meter case per se.

Like parts are indicated by similar characters of reference through the several views.

Referring to the drawings, the invention is here disclosed as embodied in a meter adapted for installation in an instrument or like panel and suitably connected and calibrated to indicate a changing condition. The mechanism of the meter is housed in a cylindrical case 10. At what may be considered its outer end, the case 10 has an external threaded flange 11 whereby the meter unit may be fixedly installed. The outer end of the case 10 is closed by a glass window 12.

The case 10 is counterbored to produce at the outer end of its inner wall surface a recessed shoulder 13. The latter peripherally seats the inner surface of the window 12 at a depth to place its outer face approximately flush with the outer end of the case. It is noted that a suitable compound such as a resilient epoxy effects a peripheral seal of the window to the case.

Referring to FIGS. 1–4 of the drawings, the preferred embodiment of the invention is there shown to include immediately below the inner surface of window 12 a thin disclike indicator 14 incorporating slots defining diametrally thereof a pointer 15. The periphery of the disc has formed thereon an integral skirt 16.

The disc 14 nests in and caps the center of a dial body 19. The latter, as will be further described, includes thereon indicia 17 which lie immediately about the disc and in a plane generally common to that of the pointer 15.

Dial 19 is an integral plastic block structure which has a particularly advantageous configuration. It is formed in this instance of a clear polycarbonate plastic. An equivalent material may be substituted provided it has similar characteristics of clarity, strength and thermal stability. While the dial may be machined to adapt to its particular environment and function, here its face 18 is peripherally defined by a short cylindrical wall section 20. Inwardly of the section 20 the dial body extends in a frustoconical shape to provide it with convergent side portions 21.

The dial face 18 is machined to produce therein a central recess 22 peripherally rimmed by a groove or trough 23. The recess 22 and groove 23 are in turn rimmed by the remainder of the dial face, which forms thereby an annular, relatively projected peripheral band 24 the face of which is flat. In reference to the base of the groove 23 the recessed portion 22 forms a relatively elevated land the surface of which is also flat and in a plane generally parallel to that of the face of the band 24.

The surface 25 of the dial block 19 which is remote from and opposite to its face 18 is machined flat to lie in a plane generally parallel to that of the face of the band 24. The surface 25 includes a plurality of equal and circularly spaced recesses 26, the purpose of which shall be further described.

The dial block 19 has a central aperture which accommodates the projection therethrough of a tubular shaft 27. The disc 14 also has a central aperture accommodating the projection therethrough of a screw 28 which is threadedly engaged in one end of the shaft 27. The disc is thus fixed at right angles to the shaft and disposed thereby to nest in the central recess of the dial face. The skirt 16 nests in the groove 23, clear of its walls, while the disc plate otherwise caps the land defined by recess 22 to dispose the outer face thereof generally coplanar with the outer face of the dial band 24.

As seen in FIG. 3, the dial body 19 is so positioned in the case 10 that its face 18 is disposed immediately below the window 12. In the process its cylindrical wall portion 22, which is appropriately dimensioned to this end, bears on the inner wall of the case and it is suitably secured in such position by any suitable means.

The shaft 27 projects axially inward of the case 10 and through the block 19 to attach adjacent the surface 25 to a yoke 30. The latter is connected by a suitable means to a sensing device. Signals from this sensing device are delivered to apply rotational impulses to the yoke 30 which in turn transmits such impulses to the disc 14 through the shaft 27. The sensing means and the means for transmitting the impulses are not per se a feature of the invention and may be achieved by a variety of conventional means. They are therefore not further described.

Looking further to FIG. 3, the inner face 25 of the dial block 19 seats on a circuit board 29 which extends transversely of the case 10 and is suitably anchored thereto. The board 29 mounts a symmetrical pattern of lamp bulbs 31 in number and arrangement corresponding to the recesses 26 in the face 25. The bulbs are lit by electrical connections suitably introduced through the inner end of the case 10. They are arranged in an electrical circuit in parallel in order that failure of one will not affect the operation of the others.

The block 19 is made translucent to achieve a luminous effect and to produce, in the use thereof, a uniform table of light. It will be noted that there is a complete containment of the bulbs in body 19 so their light emission is completely utilized.

In the instance of the described embodiment, the translucency is accomplished by applying to the surface of the dial block a finish paint or lacquer. The paint material may be suitably comprised of a mixture of powdered polycarbonate, a diffusing powder such as white vanadium, when the surface is to be white, together with a flatting agent such as calcium carbonate and a solvent such as methyl chloride. As this finish is applied it first softens the block surface which absorbs a portion of the lacquer. As the lacquer dries it hardens, whereupon the interface becomes a true chemical bond. The lacquer then becomes an integral part of the block and is removable therefrom only by machining or abrading. It will neither blister nor delaminate from the surface of the block.

Once made translucent, the block 19 may have its indicia defined in various manner. In the example illustrated the band 24 is reverse printed or silk screened with an opaque paint to mark out all surface areas except those which define the indicia 17. The groove 23 is also covered with opaque paint. Referring to FIG. 3 of the drawings, it may be there seen that the circuit board 29 not only mounts the bulbs 31 but extends transversely of the case 10 to provide a seal against escape of light from the rear of the dial block 19. At the outer face of the dial block 19, the disc 14, having been made opaque, as disposed in capping relation to the translucent central land bounded by the opaque surface groove 23, it effectively prevents the passage of light except through the slots which define the pointer 15. The disc skirt 16 functions to prevent leakage of light while stiffening and stabilizing the thin disc structure.

Since the dial face completely bridges the case immediately under the window 12, when the bulbs 31 are lit, their full capacity will transmit through the translucent areas of the dial face which are left to define indicia on the band 24 and through the land in recess 22 to pass only through the pointer 15. The angularity of the sides 21 of the dial block is such to cause laterally directed light to be reflected therefrom and in a sense outwardly generally at right angles to the surface of the band 24. In this manner, there is optimal usage of the light and a direct projection thereof through the indicia 17 and the pointer 15 to give a concentrated light effect. In this respect the benefit to the observer is believed quite obvious. Further, the arrangement provides a uniform table of light available at the dial face, the lighting in all areas being of generally uniform intensity. The intensity is such and the lighting arrangement that efficient that even if one bulb should fail, the concentrated light effect will be distributed and still give adequate light dispersal from the translucent body to produce an easy reading of the dial face. This is, of course, enhanced by the fact that the structure of body 19 and the disc 14 disposes their reading components in a generally common plane at the window 12, the latter of which is flush with the end of the case 10.

The lack of significant relative planar displacement of the pointer and indicia which are indirectly but intensely lit avoids the incidence of parallactic error in readings which are present in conventional meters under the circumstances previously described. The benefits in an aircraft are considerable and believed self-evident. Readings are not only made easier by the system but they may be had more quickly and the results are inherently more accurate.

It will be obvious that the disc 14, rather than being slotted to provide a light-transmitting pointer 15, may also have a translucent material in the indicator area while the remainder is opaque.

A further feature which may be incorporated in the invention meter is illustrated in FIG. 4 of the drawings. It is to be here noted that the surface of the light-transmitting land in recess 22 may have successive radial pie-shaped segments colored by different translucent paint. Thus, there may be a surface segment 40 tinted yellow, a segment 41 green and a segment 42 red and each will transmit light in accordance with its color. Thus, as the pointer 15 swings the color of light which it transmits may immediately signal a condition critical to the indicated indicia. This is of important advantage where responsive action must be immediately taken by the observer. In the last respect note FIG. 5 of the drawings. This schematically illustrates the invention as applied in a meter where the face 18' of a dial block 19' such as the block 19 is fully capped by a very thin disc 14' such as the disc 14. In this instance the color-coded surface on the dial face may give the only indication required from the meter to apprise the observer of a particular condition of the related operating apparatus. The simplicity and economy of this becomes self-evident particularly when one considers that in such case the entire surface 18' of the translucent block 19' may be machined flat and need not be painted other than with the translucent white and color segments. In this instance good effects are achieved with the light-transmitting block indicating surface completely bridged by the disc 14'. Note in this case that the indicia and indicator are enabled to lie so close as to almost be in the same plane.

FIG. 6 of the drawings shows yet another concept of the invention. While not preferred, it can have application and advantage even where lighting is not a particular problem. As schematically shown, the viewing window of case 10 is identified by a numeral 12". In this instance the indicia 17" are printed on the underside of the window per se. The translucent dial body 19' having a flat face without indicia and the completely capping mask 14', as shown in reference to FIG. 5, may be applied immediately under the window and so arranged that light passing through the pointer cut out of the disc may highlight the indicated indicia immediately thereof on the undersurface of the window. The effectiveness of opaque indicia being so defined is believed obvious. Moreover, in such instance the disc indicator may be so close to window 12" as to have its pointer to all purposes and effects substantially in the plane of the related indicia. As an alternative, where lighting is of no particular concern, the dial body may be eliminated, the disc 14' made whole without slots and the pointer 15' thereon painted on the disc in contrasting color, for example, lighter and definitive of the indicia when lying immediately thereunder to provide for easy vision without the problems of parallactic error. Of course, as indicated, this is not the preferred embodiment of the invention but does embody significant features of distinctive note.

FIG. 7 shows a schematic of a meter of the type where a continuous tape 50 serves as the movable element. The tape 50 moves over spaced rollers 51 and 52 and has disposed thereunder between the rollers a rectangular plastic block 53. The block 53 is of material and translucent coating similar to that used in reference to block 19 and is similarly lighted by bulbs 31' similarly incorporated. The tape has a perforate section and may be driven, for example, by a gearlike device connected to a servomotor 54.

Tape 50 may be made of Mylar or like thin plastic material and masked except for the indicia areas to produce thereby translucent indicia through which light from the block 53 may project. In the alternative, since light may be encased in a manner as previously described, the tape may be made translucent and the indicia thereon opaque. In this last instance the light outlines the indicia to highlight its definition. The reference pointer related to the moving tape may be imprinted in opaque material on a projected marginal portion of the illuminating block 53. Again, the tape and pointer are substantially coplanar and immediately under a superposed flush-mounted meter window. A further concept would provide an opaque mask on the meter window except for a slit defining a reference station, thereby eliminating the need for the pointer described. In this last case, the window opening would have full light from the translucent block thereunder highlighting the indicia at the opening at any one time.

A preferred modification of the meter case and a uniquely advantageous means and method for effecting a seal thereto of the window 12 is shown in FIG. 8 of the drawings. Here the meter case takes the form of a sleeve 60 to one end of which seats the window 12. As shown, the diameter of the window 12 is the same as that of the sleeve 60. The end of the sleeve 60 which abuts the window has its outer surface cut back by a chamfer 61. The latter defines with the adjacent peripheral portion of the inner surface of the window 12 a recess which has a triangular cross section. Immediately adjacent the chamfer 61 the sleeve 60 has a circumferential groove 62 which has a rectangular cross section. As will be seen from FIG. 8, the assembly of the window to the sleeve 60 further requires a flanged cap ring 63. The ring 63 has to its outermost end an internally projected flange 65 the inner diameter of which is less than the diameter of the window but not less than the inner diameter of the sleeve. Moreover, the outermost surface of the flange 65 is chamfered at its innermost edge. Thus, the innermost edge of the flange 65 has a generally conical form, expanding in a sense outwardly of the ring 63. At its opposite end the ring 63 has an internally projected flange 64 the inner diameter of which enables a slip or press fit thereof about the sleeve 60. As will be obvious, the flanges 64 and 65 define therebetween with the ring 63 a ringlike groove.

To effect an assembly of the sleeve 60, window 12 and ring 63 in accordance with the invention one provides an epoxy lock. Epoxy (identified as 66) is first applied in the inner groove of the ring 63. The window 12 is then inserted in the ring 63, past flange 64, to seat the peripheral portion of its outer face to the innermost face of flange 65. Epoxy is then applied to fill the sleeve groove 62 and the surface of chamfer 61 is evenly coated with the same substance. This chamfered and grooved end of sleeve 60 is then slowly inserted in the ring 63 past the flange 64 to firmly seat to the outer peripheral portion of the inner surface of window 12. Excess epoxy, if any, which might exude past ring 64 is wiped off. The parts thus related are firmly held in assembly and welded together as the epoxy is allowed to normally harden. As it hardens, the epoxy locks in the triangular undercut provided by the chamfer 61 to interconnect the window to the sleeve while welding the two to the ring 63. The lock is emphasized by the welding of the epoxy to the sleeve in the groove 62 and to the flange 64 of the ring 63.

Once this assembly is effected, the remainder of the meter structure previously described may be then applied through the open inner end of the sleeve 60 in an obvious manner. It will be evident that by the assembly just described, there results an interlock of the window to the meter case which is positive and effects a permanent seal preventing leakage thereby in any respect. Further, the manner in which the assembly is achieved insures an optimal viewing through the window.

It should be obvious of course that there are many variations of the embodiments of the invention inherently apparent from those described and such are contemplated as within the scope of the present invention. For example, available lighting may be such that a dial block may be coated with reflective paint to utilize the environment of optimal external light. In such instance the readings would be directly reflected to the eye of the observer. Similarly, in particular circumstances, a plate of electroluminescent material may replace the lighting block. Nevertheless, the use of the translucent lighting block in the manner and of a nature here described affords a uniquely advantageous meter. Per se, it is unconnected to the electrical system and may be easily machined and formed to fit the application. It is in a single piece and has no separable or cemented parts to interfere with the full and balanced distribution of light thereby as described.

In conjunction with the block is the indicator disc of thin lightweight character optimally balanced and facilitating readings immediately at the viewing surface of the meter window. It is noted that the wide surface area of the disc lends itself to a wide variation of slits or designs for indicating means. Of course, the form of the disc may be modified where circumstances so require. In reference to the examples illustrated, take note that the pointer embodied may be the full length of the disc diameter and thereby lend readability and quick scanning.

The invention meter is accordingly more simple yet rugged, and may be easily serviced. It imposes minimal load on electrical systems, reacts easier to transmitted signals, and provides no disturbing or distracting light patterns. It definitely has faster response due to the light, balanced nature of the indicator. Most important of all, with all the advantages listed and apparent, the invention meter is economical to fabricate.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A meter characterized by means defining a viewing surface, dial indicia on said viewing surface, an indicator device including indicator means, said indicator device being immediately adjacent said viewing surface and in a plane practically common to that of said indicia, means supporting said indicia and indicator device to provide for their relative motion, said indicator device being a thin platelike object which disposes for rotary motion immediately adjacent said viewing surface with clearance therebetween sufficient only as required to permit this rotary motion, and lighting block means in a backing relation to said platelike indicator device and arranged to illuminate at least one indicating means on said indicator device and said dial indicia, said viewing surface and said indicator device being disposed in a relatively concentric relation, the former having the shape of an annulus and the latter having the form of a disc centered within the annulus, said viewing surface and the top surface of said disc being in substantially the same plane, said viewing surface forming an integral part of said lighting block and being illuminated therethrough.

2. A meter characterized by means defining a viewing surface, dial indicia on said viewing surface, an indicator device including indicator means, said indicator device being immediately adjacent said viewing surface and in a plane practically common to that of said indicia, means supporting said indicia and indicator device to provide for their relative motion, said indicator device being a thin platelike object which disposes for rotary motion immediately adjacent said viewing surface with clearance therebetween sufficient only as required to permit this rotary motion, and lighting block means in a backing relation to said platelike indicator device and arranged to illuminate at least one indicating means on said indicator device and said dial indicia, said viewing surface being an integral part of said lighting block, said block providing an annular surface containing thereon said dial indicia and providing further a central recessed portion the bottom of which is color coded, said platelike indicator device being received in said recess and having indicating means in the form of an open slot through which illumination in changing color is visible during rotation of said device.

3. A meter characterized by means defining a viewing surface, dial indicia on said viewing surface, an indicator device including indicator means, said indicator device being immediately adjacent said viewing surface and in a plane practically common to that of said indicia, means supporting said indicia and indicator device to provide for their relative motion, said indicator device being a thin platelike object which disposes for rotary motion immediately adjacent said viewing surface with clearance therebetween sufficient only as required to permit this rotary motion, and lighting block means in a backing relation to said platelike indicator device and arranged to illuminate at least one indicating means on said indicator device and said dial indicia, said means defining said lighting block means including a unitary illuminable block having inner and outer ends, a midportion of the outer end being recessed, said viewing surface being formed on the outer end as a relatively elevated annulus surrounding said recessed midportion, the platelike object comprising the indicator device being a relatively rotatable disc received in said recessed midportion and including means defining a pointer and having the top surface thereof substantially in the plane of said viewing surface, and means for lighting said illuminable block from the inner end thereof, said disc being of a form to act as a mask save for said pointer which transmits light from said block.

4. A meter according to claim 3 characterized in that in the outer end of said body said recessed midportion and said relatively elevated annulus are connected by an annular trough darkened to be opaque, the periphery of said disc being turned down to be received in said trough to prevent leakage thereby of light.

5. A meter according to claim 3 characterized in that the outer end of said block in said recessed midportion is translucent color imprinted so that changing rotary positions of said pointer may be recognized by changing colors which are sighted therethrough.

6. A meter according to claim 3 characterized by a case, said illuminable block bridging said case at its viewing end and a circuit board providing a backing for the inner end of said block and mounting said lighting means.

7. A high-visibility meter including a case having a window mounted therein to be approximately flush with one end of said case, a lighting block occupying a fixed position in said case and having an outer end parallel to and closely adjacent to said window, said block being formed with a through opening communicating at said outer end of the block with a central shallow recess therein, said recess defining thereabout a surrounding indicia bearing annular land on the said outer end of said block, a rotary shaft disposing in said through opening, indicator means connected to said shaft and received in said shallow recess to be substantially coplanar with said annular land, and means for uniformly illuminating said block from the inner end thereof, said indicator means forming in part a mask over the central recessed area of the outer end of said block substantially to limit illumination to the indicia bearing annular land thereof.

8. A meter according to claim 7, wherein said lighting block is made of a coated clear plastic, the coating being a lacquer including a mixture of a powdered plastic material like that of which the block is made, a diffusing powder, a flatting agent and a solvent, a portion of the lacquer being absorbed into the block and becoming an integral part thereof, said block being made translucent thereby and assuming a color in accordance with the color of the selected diffusing powder.

9. A meter according to claim 7, wherein said central shallow recess has a flat bottom in parallel inwardly spaced relation to said annular land and terminates at its periphery in a circular groove extending inwardly of the plane of said flat bottom, said indicator means including a disc disposing in said recess in parallel relation to said flat bottom thereof and being formed with a peripheral inwardly projecting skirt received in said groove.

10. A meter according to claim 9, characterized in that the surfaces of said annular land and of said groove are covered with an opaque coating, the indicia on said annular land appearing as interruptions in said opaque coating.

11. A meter according to claim 9, wherein the flat bottom of said recess is color coded, said disc acting as a mask in said recess and having a pointer slot therein for a restricted view of the illuminated bottom of said recess.

* * * * *